(12) United States Patent
Vacca et al.

(10) Patent No.: US 12,035,719 B2
(45) Date of Patent: Jul. 16, 2024

(54) ANTIVIRAL COMPOSITION COMPRISING MODIFIED ZEOLITES

(71) Applicant: SAES GETTERS S.P.A., Lainate (IT)

(72) Inventors: Paolo Vacca, Milan (IT); Miriam Riva, Lomazzo (IT); Katarzyna Fidecka, Cantù (IT)

(73) Assignee: SAES Getters S.p.A., Lainate (IT)

( * ) Notice: Subject to any disclaimer, the term of this patent is extended or adjusted under 35 U.S.C. 154(b) by 0 days.

(21) Appl. No.: 18/029,941

(22) PCT Filed: Nov. 16, 2021

(86) PCT No.: PCT/EP2021/081804
§ 371 (c)(1),
(2) Date: Apr. 3, 2023

(87) PCT Pub. No.: WO2022/101496
PCT Pub. Date: May 19, 2022

(65) Prior Publication Data
US 2023/0329241 A1    Oct. 19, 2023

(30) Foreign Application Priority Data
Nov. 16, 2020 (IT) .................. 102020000027390

(51) Int. Cl.
| A01N 59/06 | (2006.01) |
| A01N 25/04 | (2006.01) |
| A01N 55/02 | (2006.01) |
| A01P 1/00  | (2006.01) |

(52) U.S. Cl.
CPC ............. *A01N 59/06* (2013.01); *A01N 25/04* (2013.01); *A01N 55/02* (2013.01); *A01P 1/00* (2021.08)

(58) Field of Classification Search
CPC ........ A01N 55/02; A01N 59/06; A01N 25/04; A01N 25/28
See application file for complete search history.

(56) References Cited

U.S. PATENT DOCUMENTS

| 4,138,363 | A  | * | 2/1979  | Hertzenberg | C11D 3/162 |
| | | | | | 510/532 |
| 4,828,912 | A  | * | 5/1989  | Hossain     | A61K 9/70  |
| | | | | | 428/537.1 |
| 6,821,586 | B2 |   | 11/2004 | Teegarden et al. | |
| 10,300,455| B2 |   | 5/2019  | Nicolas et al. | |
| 2007/0243263 | A1 | | 10/2007 | Trogolo | |
| 2016/0137517 | A1 | * | 5/2016 | Nicolas | C01B 39/46 |
| | | | | | 423/709 |
| 2022/0089105 | A1 | * | 3/2022 | Reddy | A01N 59/16 |

FOREIGN PATENT DOCUMENTS

| CA | 2974025   | * | 4/2011 |
| CN | 110234426 A |   | 9/2019 |
| GB | 2006257   | * | 5/1979 |

OTHER PUBLICATIONS

Julbe, A. et al., "Zeolite A Type," "Zeolite X Type," "Zeolite Y Type" in: Drioli, E. et al. (eds), Encyclopedia of Membranes, Springer, Berlin, pp. 2055-2056 and 2059-2061, 2016.*
Phadtare, S. et al., "Immobilization and biocatalytic activity of fungal protease on gold nanoparticle-loaded zeolite microspheres," Biotechnology and Bioengineering, vol. 85(6), pp. 629-637 (2004).*
English abstract of JP 2017-150117 (2017).*
Lin, Q. et al., "Sanitizing agents for virus inactivation and disinfection," View, vol. 1(2), pp. 1-26 (Jun. 2020).*
International Search Report and Written Opinion issued Jan. 20, 2022 in PCT/EP2021/081804 , 15 pages.
Italian Search Report and Written Opinion issued Jul. 19, 2021 in Patent Application No. IT202000027390 (with English translation of Categories), 10 pages.
Jia-Ching Lin et al, "Distribution of Silicon-to-Aluminum Ratios in Zeolite ZSM-5", J. Chem. Soc., Faraday Trans. 1, 82, XP-002789337, 1986, pp. 2645-2649.
Ming Zhou et al, "Synthesis of mesoporous ZSM-5 zeolite crystals by conventional hydrothermal treatment", RSC Advances, 3, 2013, XP055825047, pp. 15596-15599.
Intention to Grant issued Feb. 3, 2023 in EP Patent Application No. 21208440.4, 36 pages.

* cited by examiner

*Primary Examiner* — John Pak
(74) *Attorney, Agent, or Firm* — Element IP, PLC

(57) ABSTRACT

The present invention relates to zeolites modified or functionalized with silane moieties, to compositions comprising said silane modified zeolites and to their use as antiviral and/or antibacterial agents. The invention also refers to materials and/or articles, such as, but not limited to, fabrics, fibers and/or polymeric coatings partly or fully covered and/or integrated with said silane-modified zeolites and/or compositions.

20 Claims, No Drawings

ANTIVIRAL COMPOSITION COMPRISING MODIFIED ZEOLITES

FIELD OF THE INVENTION

The present invention relates to a composition comprising modified zeolites having both antiviral and antibacterial activity.

BACKGROUND ART

In recent years, different infectious diseases have been spreading all over the world, with consequent sanitary and social problems. In particular, the last year pandemic infection COVID-19 caused by SARS-COV2 fundamentally changed the known asset of the world with severe consequences for people health, and economic situation.

To date, there is still no vaccine or causal treatment against the known Severe Acute Respiratory Syndrome (SARS) caused by coronavirus and it is therefore very important to prevent the infection.

It is now well known that COVID-19 infection, as well as the Avian SARS infection, can spread from an infected person's mouth or nose in small liquid particles when they cough, sneeze, speak, sing or breathe heavily but also through indirect contact via every kind of contaminated surface, objects and articles (such as door knobs, tables, public surfaces, clothing etc. . . . ) come into contact with the virus. Indeed, as reported in recent literature, the virus can survive several hours or days depending on the type of surface.

Therefore, for the purpose of preventing the infection, it is considered effective to keep clean the articles that would be frequently touched by infected persons by means of disinfection and the like.

It has been reported that general disinfectants such as ethanol and sodium hypochlorite can easily remove the virus; however, this kind of molecules show just a temporary effect and they are generally not able to keep surfaces and articles clean over time.

Moreover, silver or copper-based inorganic agents have been known as anti-microbial agents since many years. For example, it is reported in U.S. Pat. No. 4,911,898 a polymer article containing zeolite particles where metal ions such as Ag, Cu or Zn, provided by an ion exchange reaction, show a generic antimicrobial effect without deterioration of the physical properties of the polymer.

Also U.S. Pat. No. 4,775,585 discloses the use of metal-zeolite incorporated into a polymer to obtain a polymer with bactericidal activity and U.S. Pat. No. 4,923,450 discloses the incorporation of zeolites in bulk materials for production of medical tubes.

A further possible approach is reported in US20030118658, which discloses a high aspect ratio microcapsule comprising metal ions (Ag, Cu and Zn) exchanged zeolites as inorganic antimicrobial agent coated with a hydrophilic polymer.

Moreover, EP1676582 specifically discloses an antiviral agent which is effective in treating a coronavirus, comprising a generic silver ion carrier including the ion exchanged zeolite.

However, according to the present invention, the inventors point out that zeolites commonly disclosed in prior art have a cytotoxic effect when placed together with cells. Said negative effect leads to the constraint of using said zeolites in a very diluted percentage in order to avoid zeolite-induced cellular toxicity, with a consequent reduction of the effective antiviral capacity.

Therefore, in order to avoid the toxic effect of zeolite compositions for cells and, at the same time, to have an effective action against the virus, the solution disclosed in the present invention relies on the use of compositions comprising zeolites modified with silane moieties; specifically by realizing a functionalization through the interaction between the hydroxyl zeolite groups and the silane functional groups.

In this field, WO2014084480 discloses a coating structure obtained by forming an antibacterial layer containing a hydroxylated inorganic carrier-antibacterial metal complex, for example, a hydroxylated zeolite-Ag complex, on an article surface followed by the preparation of silicon-based (IF) anti-fingerprint coating layer thereon; and an alternative coating structure obtained by forming an antibacterial layer containing an organic carrier having an aminosilane group-antibacterial metal complex, for example, an EDTA having an aminosilane group-Ag complex, followed by the preparation of a fluorine-based (AF) anti-fingerprint coating layer.

A different approach is represented by U.S. Pat. No. 7,311,839 that defines as antimicrobic agent Surfactant-Modified Zeolites (SMZ) created by treating zeolites with a surfactant, such as hexadecyltrimethylammonium (HDTMA), which converts the negative surface charge of the zeolites to the positively charged surface of the SMZ.

However, both solutions mentioned do not involve the use of zeolites directly superficially modified with silane moieties in order to achieve the desired antiviral effect, i.e. zeolites having on their surface silane groups directly bonded to the alumino-silicate lattice.

Moreover, it is important to point out that, as reported in the cited prior art, the common approach for an antimicrobial action involves the use of an amount of metals such as Ag, Cu and Zn which, as drawback, can leave traces and residues of them in the final products resulting in undesired cytotoxic effects. On the contrary, the herein described solution can avoid or reduce the use of metals with a consequent overcoming of the related drawbacks. Also, CN110234426 discloses a controlled-release core-shell composite that is based on a porous ZSM-5 zeolite core, wherein active ingredients may be supported in the micropores of the core. The core can be functionalized with a silane coupling agent and then be reacted with an organic polymer to covalently bond the polymer to the silane-functionalized zeolite to produce a polymer-coated zeolite. However, this core-shell composite is not suitable for an actual use as antiviral or antibacterial because, once the polymer-coated zeolite is formed, available functional groups of the silane coupling agent are limited. Besides, even before coupling, the ZSM-5 zeolites structure would bring to a reduction of the available surface and, as a consequence, the silane moiety would be embedded in the porous matrix of the ZSM-5 zeolite and therefore not massively available for an effective antibacterial or antiviral action.

Therefore, the need of modified zeolites able to overcome the drawbacks of those already known in the art, in particular with no or decreased cytotoxic effect, is still very felt.

SUMMARY OF THE INVENTION

With the aim of providing a composition able to overcome the drawbacks highlighted above, the inventors of the present invention surprisingly found that, by functionalizing zeolites with a silane moiety, the so obtained modified zeolites can be used as an effective antiviral and/or antibacterial agent.

The use of the terms antiviral and/or antibacterial should be generally understood as a biocidal product, therefore an active substance that is intended to destroy, deter, prevent the action of harmful or undesired organisms.

Therefore, the present invention refers to zeolites, preferably Faujasite (FAU) zeolite, Linde Type A (LTA) zeolites or mixtures thereof, with a silicon to aluminum (Si/Al) atomic ratio comprised between 1 and 30, modified or functionalized with silane moieties, wherein said silane moieties are as better defined in the following detailed description.

The present invention also refers to antiviral compositions, preferably in form of a dispersion, comprising at least one of said modified zeolites and optionally one or more additional components such as, but not limited to, antiviral agents, fillers or rheology modifiers etc.

As will be apparent from the following detailed description and examples, the modified zeolites and/or compositions according to the invention, proved to be effective antiviral and/or antibacterial agents. Therefore, the invention also refers to the (non-therapeutic) use of said modified zeolites or compositions as antiviral and/or antibacterial agents, particularly for maintaining the surface of an article free of pathogens, in particular viruses, more in particular SARS-COV-2.

In the light of the above, the modified zeolites or compositions comprising them according to any embodiment of the present invention can be included in several materials and/or articles so as to prevent the infections from spreading, for example, by users touching, or coming into contact with, the aforementioned materials and/or articles. Therefore, the present invention also refers to materials and/or articles, such as, but not limited to, fabrics, fibers, polymeric coatings, multilayer structures, wherein said modified zeolites and/or compositions partly or fully cover at least one of their surfaces and/or are integrated inside them.

Other advantages and features of the present invention will become apparent from the following detailed description.

DETAILED DESCRIPTION OF THE INVENTION

As anticipated above, the present invention refers to zeolites, preferably Faujasite (FAU) zeolite, Linde Type A zeolites or mixtures thereof, with a silicon to aluminum (Si/Al) atomic ratio comprised between 1 and 30, characterized by a silane functionalization, in particular a surface functionalization with a silane moiety.

The present invention also refers to compositions, preferably in form of a dispersion, comprising at least one of said modified zeolites.

Therefore, an object of the present invention is to provide an antiviral composition comprising one or more kind of zeolites with a silicon to aluminum (Si/Al) atomic ratio comprised between 1 and 30, wherein said one or more zeolites are characterized by silane functionalization.

Said antiviral composition comprising one or more zeolites with a silicon to aluminum (Si/Al) atomic ratio comprised between 1 and 30, wherein the one or more zeolites are characterized by a surface functionalization with a silane moiety or silane compound.

In a preferred embodiment said Si/Al atomic ratio is comprised between 1 and 15.

In another preferred embodiment, said Si/Al atomic ratio is comprised between 2 and 15. According to any embodiment of the present invention, zeolites can be selected in a group consisting of Faujasite (FAU) zeolite, Linde Type A (LTA) zeolite or mixtures thereof and can preferably be used in an amount comprised between 1 and 30% by weight with respect to the total composition weight.

Said zeolites are in the form of powders that, submitted to the analytical protocol defined according to the method ISO 13320:2020, show an average particle size characterized by a $X_{90}$ value, where $X_{90}$ indicates the spherical diameter at which 90% of the particles in the sample are comprised in the given range on a volume basis, comprised between 0.1 µm and 10 µm, preferably between 0.6 and 5.0 µm. Inventors found that silane compounds particularly suitable to obtain the aimed technical effect according to the present invention should be present in an amount comprised between 0.5 and 15% by weight with respect to the total zeolites weight. In other words, silane compounds can be present in an amount comprised between $0.1*10^{-3}$ and $1.0*10^{-3}$ by mol with respect to 1.0 g of zeolites, more preferably between 0.2 and $0.5*10^{-3}$.

In a preferred embodiment, said silane moiety or silane compound can be selected among (3-aminopropyl) trimethoxysilane, (3-aminopropyl) triethoxysilane, N-trimethoxysilylpropyl-N,N,N-trimethylammonium chloride, octadecyldimethyl (3-trimethoxysilylpropyl) ammonium chloride, tetradecyldimethyl(3-trimethoxysilylpropyl) ammonium chloride, n,n-didecyl-N-methyl-N-(3-trimethoxysilylpropyl)ammonium chloride, s-(trimethoxysilylpropryl) isothiouronium chloride, 3-(Trihydroxysilyl) propyldimethyloctadecyl ammonium chloride, silsesquioxanes 3-(dimethyloctadecylammonio)propyl, hydroxy-terminated, chloride,(3-Glycidoxypropyl) trimethoxysilane and mixtures thereof.

According to a preferred embodiment, said silane moiety or silane compound can be selected among 3-(Trihydroxysilyl) propyldimethyloctadecyl ammonium chloride, octadecyldimethyl (3-trimethoxysilylpropyl) ammonium chloride and mixtures thereof. The zeolites modified or functionalized with silane moieties of the present invention can be obtained according to any of the method known to a skilled in the art.

For instance, silane functionalized zeolites can be obtained by dispersing or solubilizing a silane compound, preferably one or more of those mentioned above, in a suitable solvent, for example ethylcyclohexane; adding the so obtained dispersion or solution on a zeolites powder, preferably a FAU and/or LTA powder, and then heating at about 200° C.

Therefore, the present invention also refers to a composition comprising one or more zeolites with a silicon to aluminum (Si/Al) atomic ratio comprised between 1 and 30, characterized by a surface silane functionalization, wherein said silane functionalization is obtainable by dispersing or solubilizing a silane compound, preferably one of those mentioned above, in a suitable solvent, preferably ethylcyclohexane; adding the so obtained dispersion or solution on said zeolites and then heating, preferably at about 200° C. As above anticipated, the composition according to any embodiment of the present invention can further comprise one or more additional components such as, but not limited to, antiviral agents, fillers or rheology modifiers etc.

For instance, the disclosed composition can further comprise one or more additional antiviral agent preferably selected among 3-iodo-2-propynylbutylcarbamate (IPBC), Biphenyl-2-ol, 1,2-benzisothiazol-3(2H)-one (BIT), Copper (II) hydroxide, Copper (II) oxide, Silver nitrate, Calcium hydroxide, Calcium oxide, magnesium oxide, magnesium hydroxide, Boric acid, Salicylic acid, Tannic Acid, ethanol and mixtures thereof. Said one or more antiviral agent can be adopted in different amount with respect to the weight of zeolites object of the present invention, resulting as the main antiviral agent or as an adjuvant in the final composition.

The composition of the invention can be, or can be used, in form of a dispersion, wherein the zeolites are dispersed in one or more dispersing phases, wherein said dispersing phases can comprise, or consist of, solvent(s), binder(s) or mixtures thereof.

In a first possible embodiment according to the present invention, the disclosed antiviral composition can be used in the form of a dispersion wherein the zeolites are dispersed in at least a solvent preferably selected in a group consisting of water, ethanol, isopropanol, pentyl alcohol, ethyl acetate, isopropyl acetate, butyl acetate, pentyl acetate, glycol diacetate, tert-Amyl methyl ether, dimethyl carbonate, 2-methyltetrahydrofuran, acetonitrile, dimethyl sulfoxide (DMSO) and mixtures thereof.

In a second possible embodiment of the present invention, the composition can be used in form of, or consists in, a dispersion, wherein the zeolites are dispersed in at least one binder preferably selected among acrylics, acrylics-styrene, -vinyl and alkyd copolymer, urethane-acrylics, aliphatic-urethanes, urethanes, polyesters, epoxies, siloxanes and polysiloxanes, polyurethanes, polystyrene, phenolic resin, poly[ethene-co-(vinyl alcohol) (EVOH), poly(vinyl alcohol) (PVAL), poly(lactic-co-glycolic acid) (PLGA), polyethylene glycol (PEG), polyethylene (PE), polystyrene (PS) and their copolymers, poly(vinyl acetate) (PVAC), waterborne or water reducible latex, biopolyesters, natural polymers, in particular polysaccharide polymers as chitosan and sodium alginate, and mixtures thereof, said binder optionally mixed with a suitable solvent.

The above disclosed antiviral composition, can be applied or integrated, for example, in a surface coating, in particular a surface polymeric coating, more in particular a surface polymeric coating solution, and/or in a multilayer structure wherein the composition is embedded in the outer layer of a polymeric coating.

In a preferred embodiment, one or more additional components such as, for example, fillers or rheology modifiers, are added to said composition or dispersion, preferably in an amount comprised between 5 and 50% by weight with respect to the total composition or dispersion weight.

Said additional components can be selected, for example, in a group consisting of hydrotalcites, zirconium phosphate, porphyrins, graphene and other two-dimensional crystals, graphene oxide, metal organic frameworks (MOFs), cellulose and antioxidant capsules, ester terminated polyamide, tertiary amide terminated polyamide, polyether polyamide, polyalkyleneoxy terminated polyamide and mixtures thereof.

As will be apparent from the following non-limiting examples, the modified zeolites of the present invention, as well as compositions comprising them, proved to be effective antiviral agents, particularly with reference to the SARS-COV-2 virus.

Therefore, the invention also refers to the (non-therapeutic) use of the modified zeolites, or compositions comprising them, according to any of the embodiment herein disclosed as antiviral and/or antibacterial agents, particularly for maintaining the surface of an article free of pathogens, in particular viruses, more in particular SARS-COV-2. In the light of the above, the modified zeolites, or compositions comprising them, according to any embodiment of the present invention can be applied onto and/or included, integrated or embedded in several materials and/or articles so as to prevent the infections from spreading, for example, by users touching, or coming into contact with, the aforementioned materials and/or articles. Therefore, the present invention also refers to materials and/or articles, such as, but not limited to, fabrics, fibers, polymeric coatings, multilayer structures, wherein said modified zeolites and/or compositions partly or fully cover at least one of their surfaces and/or are integrated or embedded inside them.

Examples

Hereinafter, the invention will be explained in more detail with reference to the following non-limiting examples. Modifications or variations of the embodiments here exemplified, obvious to an expert in the art, are encompassed by the appended claims.

Ion exchange process for Counterexamples C1 and C2

Specifically, 15 g of FAU zeolites with an average size comprised between 0.5 μm and 5 μm are dispersed in a solution of Silver salt, or zinc salt (e.g nitrate salt), magnetically stirrer for 24 h in dark environment, then filtered on a filter paper and thermally treated to promote the solvent evaporation.

After a milling process, the sample is thermally traded at 500° ° C. for 8 h. Resulting Ag, or Zn exchanged amount, is evaluated by inductively coupled plasma (ICP) Mass Spectrometry.

Silane functionalization process for Samples S1 to S4 and C1

In order to realize the zeolites functionalization as first step 1 g of silane (3-Aminopropyl)trimethoxysilane is dispersed in 2.5 g of ethylcyclohexane. The prepared solution is then added, drop by drop, on 5 g of zeolites powder (both metal-doped zeolites such as C1 and not such as S1-S4) and then mixed at 1500 rpm for 5 minutes.

The resulted sample is thermally treated at 200° C. overnight.

Resulting silane amount is evaluated by Thermal Analysis coupled with Mass Spectrometer. In detail Thermogravimetric analysis is combined to Differential Scan calorimetry and Mass Spectrometry (TG-DSC-MS) in order to detect mass changes and enthalpy changes during thermal analysis. The mass loss, in 400-550° C. temperature ranges, resulted in 7.4% of silane quantity.

Tannic Acid Functionalization Process for Sample C3

5 g of tannic acid is dispersed in 20 g of ethyl acetate. The prepared solution is then added, drop by drop, on 10 g of zeolites powder and then mixed at 1500 rpm for 5 minutes.

The resulted sample is thermally treated at 200° ° C. overnight.

TABLE 1

Zeolite samples

| Sample | Zeolite | Metal | Ion % wt | Si/Al ratio | Functionalization |
|---|---|---|---|---|---|
| S1 | FAU | — | — | 10 | (3-Aminopropyl)trimethoxysilane |
| S2 | FAU | — | — | 10 | (3-Glycidoxypropyl)trimethoxysilane |
| S3 | LTA | — | — | 1 | (3-Aminopropyl)trimethoxysilane |
| S4 | LTA | — | — | 1 | (3-Glycidoxypropyl)trimethoxysilane |
| C1 | FAU | Ag | 6, 4 | 10 | (3-Aminopropyl)trimethoxysilane |
| C2 | FAU | Zn | 4, 4 | 10 | — |
| C3 | FAU | — | — | 10 | Tannic acid |

Then, the antiviral activity of said samples and their simultaneous cytotoxicity is tested according to the following method.

Specifically, for each sample an amount of 200 μl are diluted in 200 μl of respiratory medium (EARLE Mem 1% PSG+0.5 μl trypsin TPCK) and transferred in low protein binding test tubes. Then, the same volume (200 μl) of $10^{-1}$ SARS-COV-2 VR10734 (virus titer $10^{-5}$) is added to each tubes and incubated for 3 h at room temperature (r.t.) under shake in order to avoid zeolites sedimentation.

In parallel, the control samples are prepared: the first one (Virus Control VC) is prepared by adding 200 μl of virus to the same volume (200 μl) of respiratory medium under the above described conditions. The second (Negative Control NC) is prepared by transferring 200 μl of zeolites plus 200 μl of respiratory medium in test tubes and treated under the same condition.

Afterwards, the supernatant is separated from zeolites by centrifugation at 10.000 rpm for 15 min, and 10 μl of each of 7 samples, 7 controls (NC) and virus control (VC) plus 90 μl of respiratory medium (1:10 first dilution) is added to 3 wells/sample of a 96 cell culture microplate and titrated by 10 fold dilution.

After that operation, 50 μl of each dilution plus 50 μl of respiratory medium plus $3 \times 10^4$ VERO-E6 cells/50 μl are prepared. VERO-E6 cells is a lineage of cells isolated from kidney epithelial cells of the African green monkey (*Cercopithecus aethiops*). Following an incubation of said samples for 72 h at 33° C. and 5% $CO_2$. microplates are fixed and stained with Gram staining plus 5% paraformaldehyde for 30 min at room temperature. As final step, microplates are washed under running water and the relative titer are read: virus titer is calculated as the maximum dilution with cytopathic effect.

The percentage of virus titer reduction of zeolites compared to the virus control titer is then calculated and reported in the following Table 2.

TABLE 2

Wherein N (negative); VC (virus control)

| Sample | Virus titer | | | Cytotoxic effect | | | % virus reduction |
|---|---|---|---|---|---|---|---|
| S1 | $<10^{-1}$ | $<10^{-1}$ | $<10^{-1}$ | N | N | N | 100% |
| S2 | $<10^{-1}$ | $<10^{-1}$ | $<10^{-1}$ | N | N | N | 100% |
| S3 | $<10^{-1}$ | $<10^{-1}$ | $<10^{-1}$ | N | N | N | 100% |
| S4 | $<10^{-1}$ | $<10^{-1}$ | $<10^{-1}$ | N | N | N | 100% |
| C1 | $<10^{-2}$ | $<10^{-2}$ | $<10^{-2}$ | $10^{-1}$ | $10^{-1}$ | $10^{-1}$ | |
| C2 | $<10^{-2}$ | $<10^{-2}$ | $<10^{-2}$ | $10^{-1}$ | $10^{-1}$ | $10^{-1}$ | |
| C3 | $<10^{-3}$ | $<10^{-3}$ | $<10^{-3}$ | $10^{-2}$ | $10^{-2}$ | $10^{-2}$ | |
| VC | $10^{-3}$ | $10^{-2}$ | $10^{-1}$ | 0 | 0 | 0 | |

The reported results point out that samples S1-S4, prepared according to the present invention, show a 100% reduction of SARS-COV-2 virus activity with a simultaneous non-cytotoxic effect.

On the contrary, comparative samples C1-C2, which present both the functionalization and the metal ion exchange, reveal the cytotoxic effect on VERO-E6 cells resulting in an inability to establish the percentage of virus titer reduction.

Comparative sample C3 further points out that some functionalization which does not use a silane moiety, brings to a cytotoxic effect on cells.

TABLE 3

Silane addition

| Zeolite | Pristine | Sample 1 | Sample 2 | Sample 3 | Sample 4 | Sample 5 |
|---|---|---|---|---|---|---|
| silane added (initial) [g] | 0 | 0.5 | 1.0 | 1.5 | 3.5 | 6.0 |
| silane added (initial) [mol] | — | 0.003 | 0.006 | 0.008 | 0.020 | 0.033 |
| % wt of attached silane (detected by TGA) | 0 | 4.9 | 6.3 | 8.5 | 13.2 | 12.8 |
| Reaction yield (%) | — | 54 | 38 | 37 | 32 | 23 |
| silane detected [mol] for 1 g of zeolite | | 0.00027 | 0.00035 | 0.00047 | 0.00074 | 0.00071 |
| pHzpc | ≤4 | 8.6 | 9.4 | 9.4 | 10.2 | 9.7 |

Table 3 reports the results of two different tests (TGA and ζ-potential) realized on different samples prepared with a progressive addition of silane amount.

The TGA test is performed on each sample to detect the mass loss, referred to the silane grafted on the zeolite surface, in 180-600° ° C. temperature range. The increase of the silane amount added to zeolite, causes increase of the moles of grafted silane on the zeolite surface. The maximum moles of silane detected is related to Sample 4 and it is equal to 0.00074 mol respect for 1 g of zeolite. Adding more than 3.5 g (0.020 of intial mol) of silane into the reaction mixture does not result with the increase of silane grafting. For Sample 5, the number of moles of grafted silane remains about 0.0007 mol respect to 1 g of zeolite, while the yield of the reaction decreases.

The ζ-potential test is adopted to evaluate the surface charge of pristine and silane functionalized zeolite, since among nanoparticles physicochemical characteristics, the surface charge is one of the key factors for toxicity. In vitro or in vivo studies conducted on nanoparticles of different composition (silicon-, silver-, polystyrene-, or carbonbased NPs), have shown that a positive zeta potential (ζ-potential) is associated with greater NP toxicity compared to a negative one. This is generally attributed to a greater capacity of positively charged nanoparticles to interact with the cell membrane through attractive electrostatic interactions with negatively charged phospholipids or membrane proteins, and to a subsequent higher NP cell uptake ("Density of surface charge is a more predictive factor of the toxicity of cationic carbon nanoparticles than zeta potential", Journal of Nanobiotechnology volume 19, Article number: 5 (2021)).

Therefore, ζ-potential analysis, that is closely related to the surface charge of particles, is measured as a function of pH solution (4.4-12 range) for pristine zeolite and with the addition of silane. The zeta potential values of zeolites are tested from pH 4.4 and not lower than that, because of a possible damage of their crystal lattice at very acidic pH. As reported in Table 3 the isoelectric point (pHzpc) for pristine zeolite could be possibly find to be ≤4. This means that its surface would obtain positive surface charge upon protonation at pH lower than 4. For all modified samples, with grafted silane on their surface, the overall charge changed and became positive within 5-8.5 pH range (plateau). The surface charge of modified zeolite samples was strictly dependent on the number of moles of attached silane. With the increase of moles of attached silane, the pHzpc of the particle has shifted to higher values. That means that the more silane was immobilized, the system remained positively charged (not deprotonated) in the wider pH range.

The invention claimed is:

1. A surface polymeric coating composition comprising a polymeric coating composition having integrated therein an effective antiviral amount of an antiviral composition comprising one or more zeolites having a silicon to aluminum (Si/Al) atomic ratio comprised between 1 and 15 and having a functionalized surface provided through interaction between hydroxyl groups of the one or more zeolites and a silane functional group of a silane moiety,
wherein:
the one or more zeolites are selected from the group consisting of Faujasite (FAU), Linde Type A zeolites, and mixtures thereof;
the silane moiety is selected from the group consisting of (3-aminopropyl)trimethoxysilane, (3-glycidoxypropyl) trimethoxysilane, 3-(trihydroxysilyl) propyldimethyloctadecyl ammonium chloride, octadecyldimethyl (3-trimethoxysilylpropyl) ammonium chloride, and mixtures thereof;
the zeolites are in the form of powders with an average particle size characterized by a $X_{90}$ value of 0.1 μm-10 μm; and
the antiviral composition does not further comprise an antimicrobial metal.

2. The surface polymeric coating composition according to claim 1, wherein the silane moiety is selected among 3-(trihydroxysilyl) propyldimethyloctadecyl ammonium chloride, octadecyldimethyl (3-trimethoxysilylpropyl) ammonium chloride and mixtures thereof.

3. The surface polymeric coating composition according to claim 1, wherein the zeolites are present in an amount of 1-30% by weight with respect to the antiviral composition weight.

4. The surface polymeric coating composition according to claim 1, wherein the zeolites are in the form of powders with an average particle size characterized by a $X_{90}$ value of 0.6 μm-5.0 μm.

5. The surface polymeric coating composition according to claim 1, wherein the silane moiety is present in an amount of $0.1 \times 10^{-3}$-$1.0 \times 10^{-3}$ mol with respect to 1.0 g of zeolites.

6. The surface polymeric coating composition according to claim 1, further comprising one or more additional antiviral agents.

7. The surface polymeric coating composition according to claim 6, wherein said additional antiviral agent is selected from the group consisting of 3-iodo-2-propynylbutylcarbamate (IPBC), biphenyl-2-ol, 1,2-benzisothiazol-3(2H)-one (BIT), boric acid, salicylic acid, tannic acid, ethanol, and mixtures thereof.

8. The surface polymeric coating composition according to claim 1, further comprising one or more fillers or rheology modifiers.

9. The surface polymeric coating composition according to claim 8, wherein said filler or rheology modifier is selected from the group consisting of hydrotalcites, zirconium phosphate, porphyrins, graphene, graphene oxide, metal organic frameworks (MOFs), cellulose, ester terminated polyamide, tertiary amide terminated polyamide, polyether polyamide, polyalkyleneoxy terminated polyamide and mixtures thereof.

10. The surface polymeric coating composition according to claim 8, wherein the one or more fillers or rheology modifiers are present in amount of 5-50% by weight with respect to the antiviral composition weight.

11. A fabric, fiber, or multilayer structure comprising an effective antiviral amount of an antiviral composition comprising one or more zeolites having a silicon to aluminum (Si/Al) atomic ratio comprised between 1 and 15 and having a functionalized surface provided through interaction between hydroxyl groups of the one or more zeolites and a silane functional group of a silane moiety,
wherein:
the one or more zeolites are selected from the group consisting of Faujasite (FAU), Linde Type A zeolites, and mixtures thereof;
the silane moiety is selected from the group consisting of (3-aminopropyl)trimethoxysilane, (3-glycidoxypropyl) trimethoxysilane, 3-(trihydroxysilyl) propyldimethyloctadecyl ammonium chloride, octadecyldimethyl (3-trimethoxysilylpropyl) ammonium chloride, and mixtures thereof;
the zeolites are in the form of powders with an average particle size characterized by a $X_{90}$ value of 0.1 μm-10 μm; and
the antiviral composition does not further comprise an antimicrobial metal; and
the antiviral composition is integrated inside the fabric, fiber, or multilayer structure, or the antiviral composition partly or fully covers at least one of the surfaces of the fabric, fiber, or multilayer structure.

12. The fabric, fiber, or multilayer structure according to claim 11, wherein the silane moiety is selected among 3-(trihydroxysilyl) propyldimethyloctadecyl ammonium chloride, octadecyldimethyl (3-trimethoxysilylpropyl) ammonium chloride and mixtures thereof.

13. The fabric, fiber, or multilayer structure according to claim 11, wherein the zeolites are present in an amount of 1-30% by weight with respect to the antiviral composition weight.

14. The fabric, fiber, or multilayer structure according to claim 11, wherein the zeolites are in the form of powders with an average particle size characterized by a $X_{90}$ value of 0.6 μm-5.0 μm.

15. The fabric, fiber, or multilayer structure according to claim 11, wherein the silane moiety is present in an amount of $0.1 \times 10^{-3}$-$1.0 \times 10^{-3}$ mol with respect to 1.0 g of zeolites.

16. The fabric, fiber, or multilayer structure according to claim 11, further comprising one or more additional antiviral agents.

17. The fabric, fiber, or multilayer structure according to claim 16, wherein said additional antiviral agent is selected from the group consisting of 3-iodo-2-propynylbutylcarbamate (IPBC), biphenyl-2-ol, 1,2-benzisothiazol-3(2H)-one (BIT), boric acid, salicylic acid, tannic acid, ethanol, and mixtures thereof.

18. The fabric, fiber, or multilayer structure according to claim 11, further comprising one or more fillers or rheology modifiers.

19. The fabric, fiber, or multilayer structure according to claim 18, wherein said filler or rheology modifier is selected from the group consisting of hydrotalcites, zirconium phosphate, porphyrins, graphene, graphene oxide, metal organic frameworks (MOFs), cellulose, ester terminated polyamide, tertiary amide terminated polyamide, polyether polyamide, polyalkyleneoxy terminated polyamide and mixtures thereof.

20. The fabric, fiber, or multilayer structure according to claim 18, wherein the one or more fillers or rheology modifiers are present in amount of 5-50% by weight with respect to the antiviral composition weight.

* * * * *